United States Patent [19]

Dupré et al.

[11] 4,174,206

[45] Nov. 13, 1979

[54] APPARATUS FOR SEPARATING PARTICULATE MATERIAL FROM AN AIRSTREAM

[75] Inventors: George T. Dupré, Palatine; Thomas M. DeMarco, Chicago, both of Ill.

[73] Assignee: NFE International Ltd., Palatine, Ill.

[21] Appl. No.: 872,658

[22] Filed: Jan. 26, 1978

Related U.S. Application Data

[63] Continuation of Ser. No. 474,000, May 28, 1974, abandoned, which is a continuation-in-part of Ser. No. 323,130, Jan. 12, 1973, abandoned, which is a continuation of Ser. No. 109,246, Jan. 25, 1971, abandoned.

[51] Int. Cl.² ............................................. B01D 45/00
[52] U.S. Cl. ........................................ 55/434; 55/432
[58] Field of Search ................... 55/434, 17, 413–416, 55/418, 432; 209/143, 145

[56] References Cited

U.S. PATENT DOCUMENTS

| 795,412 | 7/1905 | Olson | 55/434 |
| 2,372,316 | 3/1945 | Curtis | 55/17 |
| 3,731,464 | 5/1973 | Brumbaugh et al. | 55/319 |
| 3,780,502 | 12/1973 | Dupre et al. | 55/337 |

FOREIGN PATENT DOCUMENTS

| 517774 | 2/1940 | United Kingdom | 55/418 |
| 864404 | 4/1961 | United Kingdom | 55/434 |
| 270484 | 3/1971 | U.S.S.R. | 55/434 |

Primary Examiner—Bernard Nozick
Attorney, Agent, or Firm—Merriam, Marshall & Bicknell

[57] ABSTRACT

An improved linear accelerator separator wherein much higher kinetic energy can be imparted to the particulate matter thereby significantly increasing the separation efficiency as compared to the prior art. In particular, the particles and airstream are rapidly accelerated and directed into an expansion chamber which is sufficiently long to permit the particles to expand or spread out and fall to the chamber bottom and to permit the airstream to lose velocity and to back up or turn around and exit from the chamer entrance.

2 Claims, 5 Drawing Figures

APPARATUS FOR SEPARATING PARTICULATE MATERIAL FROM AN AIRSTREAM

BACKGROUND OF THE INVENTION

This application is a continuation of application Ser. No. 474,000, filed May 28, 1974, which is now abandoned is a continuation in part of application Ser. No. 323,130 filed Jan. 12, 1973 now abandoned which in turn is a continuation of application Ser. No. 109,246 filed Jan. 25, 1971 now abandoned.

This invention relates to a method and apparatus for separating particulate material from an airstream by changing the direction path of the airstream from the particulate material.

Various types of centrifugal apparatus have been used for separating air from particulate matter by centrifugal force—the particulate matter being held to an inner circular surface by centrifugal force and the air being drawn from this surface and exiting from the device through an exit separate from the particulate matter exit. The higher the momentum (kinetic energy) imparted to the particulate matter the higher the degree of separation since the particulate matter of greater density than air tends to continue in the same direction in which it has been accelerated whereas the relatively less dense air can more readily change directions. Imparting higher amounts of kinetic energy to the particulate matter will therefore result in increased separation efficiency.

Centrifugal separators have a rather limited range as to the amount of kinetic energy which can be imparted. Linear accelerator separators have been proposed sine a somewhat higher range of kinetic energy can be obtained. In the proposed linear accelerators the particulate matter and airstream are gradually accelerated in a linear direction and the direction of the air is changed by various techniques to separate the air from the particles, as shown for instance in U.S. Pat. No. 485,915 and British Pat. No. 517,774.

SUMMARY OF THE INVENTION

In accordance with the principles of the present invention there is provided an improved linear accelerator separator wherein much higher kinetic energy can be imparted to the particulate matter thereby significantly increasing the separation efficiency as compared to the prior art. In particular, the particles and airstream are rapidly accelerated and directed into an expansion chamber which is sufficiently long to permit the particles to expand or spread out and fall to the chamber bottom and to permit the airstream to lose velocity and to back up or turn around and exit from the chamber entrance.

A straight linear accelerator nozzle provides the rapid acceleration of the airstream and particulate matter.

DESCRIPTION OF A PREFERRED EMBODIMENT

Figure 1:
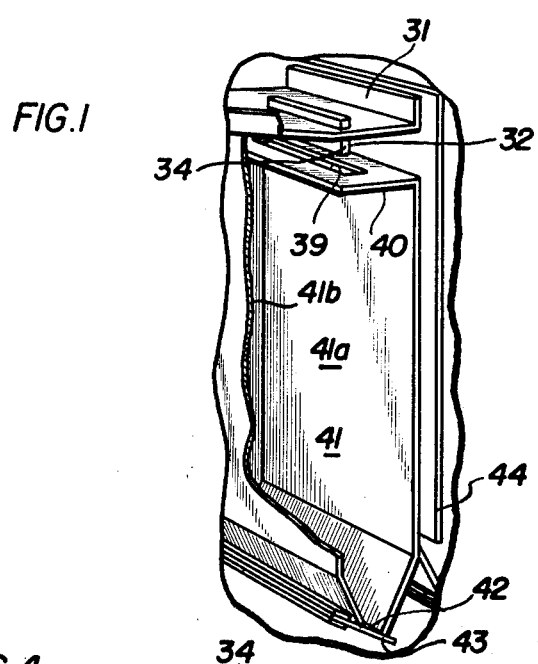
FIG. 1 is an isometric view of an embodiment of the invention showing a linear accelerator apparatus in accordance with the invention, with portions cut away.

FIG. 1 shows an embodiment 10, of a linear accelerator, particle separator of the present invention. An electric motor and blower (not shown) provide the vacuum source for particle separator apparatus 10. The motor and blower may be of standard construction with a preferred motor size for most industrial purposes being about 25 horsepower, permitting development of about a 20 inch Hg vacuum. Size specifications are, of course, subject to wide variation, depending upon the particulate size and weight characteristics of the materials to be collected.

Figure 2:
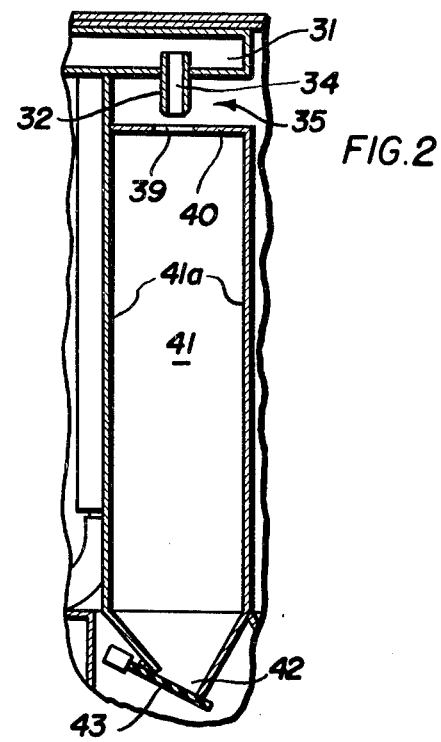
FIG. 2 is a sectional view of the embodiment shown in FIG. 1.

Referring to FIGS. 1 and 2, the airstream, carrying particulate materials is drawn from an upper transverse chamber 31 through a vertically-extending linear accelerator nozzle 32.

Figure 3:
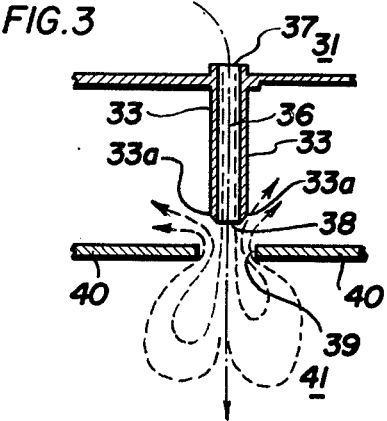
FIG. 3 is an expanded view of a portion of FIG. 2, illustrating the linear accelerator nozzle.

Referring to FIG. 3, linear accelerator nozzle 32 may be of a generally rectilinear configuration with rectangular broad side walls 33, 33 and narrow end walls 34, 34 extending from transverse chamber 31 into accelerator ante-chamber 35 and defining an open-ended, prismic accelerator passage 36 having an inlet 37 and an outlet 38.

As illustrated in FIG. 3 broad size walls 33, 33 may be provided with beveled edge portions 33a adjacent outlet 38. Narrow end walls 34, 34 may be similarly constructed.

Outlet 38 of nozzle 32 is centered directly above a rectangular orifice 39 in an accelerator chamber ceiling plate 40.

In the course of passage through accelerator nozzle 32, particulate materials in the airstream are accelerated and exit through nozzle outlet 38 at a velocity greater than their initial velocity at nozzle inlet 37. Upon exiting outlet 38, accelerated materials travel through antechamber 35 and enter an expansion chamber 41 through the central portion of orifice 39.

The linear accelerator nozzle 32 provides rapid acceleration of the particulate matter since full acceleration of the airstream is accomplished at the nozzle inlet 37. This enables more time for the particulate matter of greater density than air to approach the velocity of the air. That is, due to the higher density of the particles as compared to air, there is a normal lag in the particle acceleration rate. As compared to the prior art, the nozzle 32 enables the particulate matter to be rapidly accelerated.

As the material and airstream enter expansion chamber 41 the heaviest of the accelerated materials tend to continue in a substantially straight downward path while the airstream "backs up" within chamber 41 and exits at the edge portions of orifice 39 into ante-chamber 35. The path of the airstream entering chamber 41 is thus generally downward, then lateral and finally upward. Typical paths of accelerated materials and the airstream are respectively represented by dash-dot and dotted arrows in FIG. 3.

In operation, substantially the entire airstream will preferably disperse laterally and turn upwardly before reaching the bottom quarter of expansion chamber 41, leaving that space as a waste collection area which is substantially undisturbed by the airstream.

The shapes, relative dimensions and spacial arrangement of linear accelerator nozzle 32, orifice 39 and main expansion chamber 41 may be subject to design variations depending upon the proposed use of the collector in which such elements are employed.

If, for example, wood shavings or other materials having a rather small mass to volume ratio are to be collected, it may be advantageous to provide a linear accelerator nozzle 32 having a substantially cylindrical configuration to avoid clogging. In such a case, a circular orifice 39 would be accordingly provided.

If exceptionally finely divided wastes predominate in the materials to be collected, the ratio of nozzle length to accelerator chamber length may be adjusted to assure that expansion chamber 41 is long enough to permit substantial turn around or back-up of the airstream without disturbance of wastes accelerated to the collection area at the bottom of the chamber. If, on the other hand, little or no such finely divided material is to be collected, a shorter chamber length may suffice for efficient operation.

Nozzle, orifice and chamber elements suitable for use in collector 10, designed for collection of typical foundry wastes such as wet and dry sand, gravel shot and metal chips, would include a nozzle 32 having a broad side wall 33 with dimensions of 21 inches by 4 inches and a narrow end wall 34 with dimensions of $\frac{1}{4}$ inch by 4 inches. A horizontal cross-section of passage 36 would accordingly be approximately $\frac{1}{4}$ inch by 21 inches. A nozzle 32 of such dimensions would preferably be centered with outlet 38 approximately $\frac{1}{2}$ inch above an orifice 39 which measured 21$\frac{1}{2}$ inches by $\frac{3}{4}$ inch. A suitable main expansion chamber would be prismic and measure approximately 27 inches along chamber walls 41a, 41a parallel to the broad side walls 33, 33 of nozzle 32 and approximately 12 inches along the walls 41b, 41b parallel to the narrow end walls 34, 34 of nozzle 32. A preferred height for main expansion chamber 41 would be approximately 48 inches.

At the base of expansion chamber 41 is an outlet 42 having a closure flap element 43. Flap element 43 may be a counterweighted rigid structure, as shown, or may be a simple flap of rubber or similar material. Flap 43 is maintained in a position closing outlet 42 during operation of collector 10 by the normal pressure differential between expansion chamber 41 and a hopper (not shown). Once the motor and blower are shut off, normal atmospheric pressure is restored to both chamber 41 and the hopper and the weight of collected materials in chamber 41 will cause flap 43 to move downwardly, allowing exhaustion of collected wastes from chamber 41 through outlet 42 into the hopper.

The airstream leaving accelerator chamber 41 through orifice 39 may be drawn down vertical channel 44 and into a filter chamber preferably provided with apparatus for filtering out and collecting substantially all remaining particulate material in the airstream.

Figure 4:
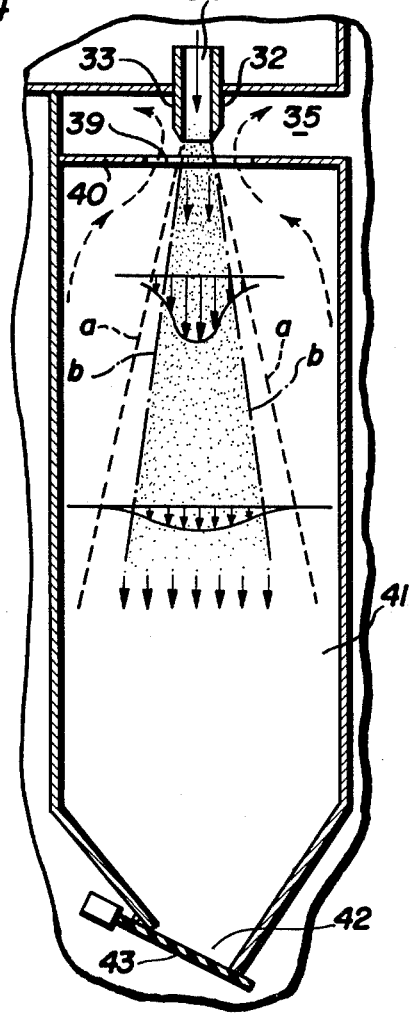
FIG. 4 is a schematic illustration of the improved separation of particulate matter from the airstream.

Referring now to FIG. 4, there is illustrated in schematic form the particle separation action in accordance with the invention which functions by the dissipation of a downwardly directed jet. The jet is rapidly formed in the nozzle 32 which defines a confined acceleration zone. As shown, the downward jet at the outlet of linear accelerator nozzle 32 is indicated by the jet boundary marked a-a for the airstream and that marked b-b for the particles. The mixture leaving nozzle 32 is in the form of a two dimensional jet in chamber 41 because of its large room and height (length). As the jet proceeds downward, its velocity profile (two shown in FIG. 4—the arrows represent the magnitude of the velocity in the jet stream) spreads out or expands while the air velocity dissipates, leaving the particles to fall to the bottom of chamber 41. The air is now in the nature of a balancing stream which backs up or turns upwardly and leaves chamber 41 through orifice 39 at low velocity (relative to the incoming jet) as shown by the dashed arrow lines passing from chamber 41 through orifice 39 into antechamber 35.

Figure 5:
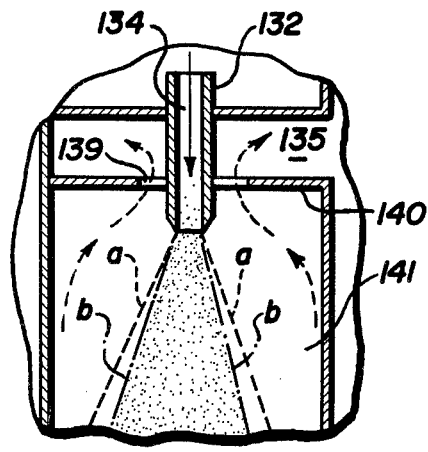
FIG. 5 illustrates an alternative embodiment of the invention.

FIG. 5 illustrates an alternative embodiment of the invention which provides the same downwardly directed jet of air and particles as that previously described. As shown in FIG. 5, the outlet of nozzle 132 is situated below flat plate 140. The particles again are rapidly accelerated in nozzle 132 and eventually fall to the bottom of expansion chamber 141 while the airstream dissipates in chamber 141 and backs up and exits at low velocity through orifice 139.

The foregoing detailed description has been given for clearness of understanding only, and no unnecessary limitations should be understood therefrom, as modifications will be obvious to those skilled in the art.

What is claimed is:

1. In apparatus for the collection of airborne particulate material from a stream of air, which includes an elongated enclosed chamber sealed at its bottom and having a chamber orifice at the top into which a stream of air is directed along the chamber length, defined between the chamber orifice and the chamber bottom, to avoid turbulence at the bottom of the chamber, the particulate matter being collected in the chamber while the airstream exits through the chamber orifice at the top of the chamber, wherein the improvement comprises:

means for gradually separating particulate material from an airstream and thereby improving the efficiency of collection of finely divided particles of particulate materials from an airstream containing a mixture of particle sizes and kinds, and said finely divided particles; and, wherein said means includes a nozzle mounted above said chamber having an input end for receiving said airstream, an outlet end communicating said airstream to said chamber orifice and a nozzle length axially aligned with said chamber orifice and extending between said input end and said output end for rapidly accelerating said airstream;

the dimensions of: (a) the axial distance between said nozzle outlet end and said chamber orifice to (b) the cross section of said nozzle to (c) the cross section of said chamber orifice to (d) the chamber length being in the ratio of about 1:10:30:90 to enable said accelerated airstream to gradually expand as it traverses from said orifice towards the chamber bottom, and the velocity of said airstream gradually dissipates substantially to zero before reaching the bottom quarter of the chamber.

2. The improved apparatus of claim 1, wherein the dimensions of said chamber length to said chamber cross section are in a ratio of about 1:7.

* * * * *